(12) United States Patent
Neel et al.

(10) Patent No.: US 9,412,270 B2
(45) Date of Patent: *Aug. 9, 2016

(54) WIRELESS VEHICLE DETECTION SYSTEM AND ASSOCIATED METHODS HAVING ENHANCED RESPONSE TIME

(71) Applicant: TRAFFICWARE GROUP, INC., Sugar Land, TX (US)

(72) Inventors: Clyde Neel, Sugar Land, TX (US); Darren Beyer, Sugar Land, TX (US); Timothy Fiebrich, Needville, TX (US); Michael Green, Rosenberg, TX (US); Kenneth W MacLeod, Sugar Land, TX (US); Srikar Vadlamani, League City, TX (US); Mark Hawkins, Cambridge, MA (US)

(73) Assignee: TRAFFICWARE GROUP, INC., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,288

(22) Filed: Mar. 19, 2015

(65) Prior Publication Data

US 2015/0194056 A1 Jul. 9, 2015

Related U.S. Application Data

(63) Continuation of application No. 14/475,916, filed on Sep. 3, 2014, now Pat. No. 9,020,742, which is a continuation of application No. 14/194,162, filed on Feb. 28, 2014, now Pat. No. 8,855,902.

(Continued)

(51) Int. Cl.
*G08G 1/00* (2006.01)
*G08G 1/042* (2006.01)

(Continued)

(52) U.S. Cl.
CPC .................. *G08G 1/042* (2013.01); *G08G 1/00* (2013.01); *G08G 1/0104* (2013.01); *G08G 1/0116* (2013.01); *G08G 1/0133* (2013.01); *H04B 7/26* (2013.01)

(58) Field of Classification Search
CPC ....... G08G 1/042; G08G 1/00; G08G 1/0133; G08G 1/0104; G08G 1/0116; H04B 7/26
See application file for complete search history.

(56) References Cited

U.S. PATENT DOCUMENTS

| 2,150,776 A | 3/1939 | Moles |
| 2,181,728 A | 11/1939 | Greentree |

(Continued)

FOREIGN PATENT DOCUMENTS

| CN | 1417756 | 5/2003 |
| GB | 2271691 | 4/1994 |

(Continued)

OTHER PUBLICATIONS

Bryan Atwood, Brett Warneke, and Kristofer S. J. Pister, Preliminary Circuits for Smart Dust, 2000, pp. 87-92, Berkeley, CA. (6 pages).

(Continued)

*Primary Examiner* — Kim T Nguyen
(74) *Attorney, Agent, or Firm* — Bracewell LLP; Brad Y. Chin

(57) ABSTRACT

Embodiments of the invention include a wireless vehicle detection systems and associated methods with extended range and battery life. The wireless vehicle detection system can include a plurality of sensor pods in communication with an access point without repeaters. Embodiments of the sensor pod can include a vehicle detector controller adapted to determine the presence of vehicles and a communication controller connected to the vehicle detector and adapted to transmit data 300 feet or more to an access point, which in turns communicates with the base station. To extend the battery life of the sensor pod, the sensor pod can be adapted to detect received communication signal strength and adjust transmitting power based upon the strength to thereby conserve power. Embodiments of the sensor pod can also include a battery connected in parallel to an HLC capacitor to further extend the life of the battery.

17 Claims, 11 Drawing Sheets

Related U.S. Application Data

(60) Provisional application No. 61/770,606, filed on Feb. 28, 2013, provisional application No. 61/770,789, filed on Feb. 28, 2013, provisional application No. 61/770,951, filed on Feb. 28, 2013.

(51) Int. Cl.
*G08G 1/01* (2006.01)
*H04B 7/26* (2006.01)

(56) References Cited

U.S. PATENT DOCUMENTS

| | | | |
|---|---|---|---|
| 3,803,570 A | 4/1974 | Barlow et al. | |
| 3,882,381 A | 5/1975 | Gregory | |
| 4,229,726 A | 10/1980 | Clark et al. | |
| 4,472,706 A | 9/1984 | Hodge et al. | |
| 5,247,297 A | 9/1993 | Seabury et al. | |
| 5,289,183 A | 2/1994 | Hassett et al. | |
| 5,381,155 A | 1/1995 | Gerber | |
| 5,491,475 A | 2/1996 | Rouse et al. | |
| 5,523,950 A | 6/1996 | Peterson | |
| 5,555,036 A | 9/1996 | Harnett et al. | |
| 5,748,108 A | 5/1998 | Geary et al. | |
| 5,757,288 A | 5/1998 | Bracht et al. | |
| 5,877,705 A | 3/1999 | Sampey | |
| 5,880,682 A | 3/1999 | Matacia et al. | |
| 5,889,477 A | 3/1999 | Fastenrath | |
| 6,011,508 A | 1/2000 | Clark et al. | |
| 6,016,109 A | 1/2000 | Kane et al. | |
| 6,029,092 A | 2/2000 | Stein | |
| 6,075,466 A | 6/2000 | Cohen et al. | |
| 6,137,424 A | 10/2000 | Cohen et al. | |
| 6,140,941 A | 10/2000 | Broad et al. | |
| 6,178,374 B1 | 1/2001 | Mohlenkamp et al. | |
| 6,208,268 B1 | 3/2001 | Scarzello et al. | |
| 6,337,640 B2 | 1/2002 | Lees | |
| 6,342,845 B1 | 1/2002 | Hilliard et al. | |
| 6,345,228 B1 | 2/2002 | Lees | |
| 6,384,739 B1 | 5/2002 | Roberts | |
| 6,411,889 B1 | 6/2002 | Mizunuma et al. | |
| 6,480,783 B1 | 11/2002 | Myr | |
| 6,483,443 B1 | 11/2002 | Lees | |
| 6,587,778 B2 | 7/2003 | Stallard et al. | |
| 6,615,130 B2 | 9/2003 | Myr | |
| 6,662,099 B2 | 12/2003 | Knaian et al. | |
| 6,671,525 B2 | 12/2003 | Allen et al. | |
| 6,750,787 B2 | 6/2004 | Hutchinson | |
| 6,781,523 B2 | 8/2004 | Matsui et al. | |
| 6,785,606 B2 | 8/2004 | DeKock et al. | |
| 6,804,503 B2 | 10/2004 | Shohara et al. | |
| 6,826,607 B1 | 11/2004 | Gelvin et al. | |
| 6,876,296 B2 | 4/2005 | Talmadge et al. | |
| 6,999,886 B2 | 2/2006 | Hilliard | |
| 7,046,166 B2 | 5/2006 | Pedyash et al. | |
| 7,221,686 B1 | 5/2007 | Belcea | |
| 7,324,559 B2 | 1/2008 | McGilbney | |
| 7,382,238 B2 | 6/2008 | Kavaler | |
| 7,382,281 B2 | 6/2008 | Kavaler | |
| 7,388,517 B2 | 6/2008 | Kavaler | |
| 7,427,931 B1 | 9/2008 | Kwong et al. | |
| 7,440,842 B1 | 10/2008 | Vorona | |
| 7,529,217 B2 | 5/2009 | Pister et al. | |
| 7,739,000 B2 | 6/2010 | Kavaler | |
| 7,797,367 B1 | 9/2010 | Gelvin et al. | |
| 7,860,639 B2 | 12/2010 | Yang et al. | |
| 7,881,239 B2 | 2/2011 | Pister et al. | |
| 7,983,835 B2 | 7/2011 | Lagassey | |
| 8,035,533 B2 | 10/2011 | Kavaler | |
| 8,059,629 B1 | 11/2011 | Pister et al. | |
| 8,319,664 B2 | 11/2012 | Kavaler | |
| 8,487,784 B2 | 7/2013 | Kavaler | |
| 8,855,902 B2 | 10/2014 | Neel et al. | |
| 9,020,742 B2 * | 4/2015 | Neel | G08G 1/042 701/117 |
| 2002/0000921 A1 | 1/2002 | Hutchinson | |
| 2002/0116118 A1 | 8/2002 | Stallard et al. | |
| 2002/0145541 A1 | 10/2002 | Matsui et al. | |
| 2002/0154032 A1 | 10/2002 | Hilliard | |
| 2002/0158776 A1 | 10/2002 | Lash | |
| 2002/0175829 A1 | 11/2002 | Dunagin et al. | |
| 2002/0177942 A1 | 11/2002 | Knaian et al. | |
| 2003/0011492 A1 | 1/2003 | Klamer et al. | |
| 2003/0201909 A1 | 10/2003 | Hilliard | |
| 2004/0246177 A1 | 12/2004 | Harris et al. | |
| 2005/0157909 A1 | 7/2005 | Griffin | |
| 2005/0190076 A1 | 9/2005 | Howard et al. | |
| 2005/0190077 A1 | 9/2005 | Kavaler | |
| 2005/0203697 A1 | 9/2005 | Dalgleish | |
| 2005/0213612 A1 | 9/2005 | Pister et al. | |
| 2006/0017549 A1 | 1/2006 | Nguyen | |
| 2006/0029061 A1 | 2/2006 | Pister et al. | |
| 2006/0097894 A1 | 5/2006 | Kavaler | |
| 2006/0109104 A1 | 5/2006 | Kavaler | |
| 2006/0132298 A1 | 6/2006 | Kavaler | |
| 2006/0202862 A1 | 9/2006 | Ratnakar | |
| 2006/0202863 A1 | 9/2006 | Kavaler | |
| 2007/0050240 A1 | 3/2007 | Belani et al. | |
| 2007/0208499 A1 | 9/2007 | Kwong | |
| 2007/0274158 A1 | 11/2007 | Agam et al. | |
| 2007/0276600 A1 | 11/2007 | King et al. | |
| 2008/0238715 A1 | 10/2008 | Cheng et al. | |
| 2008/0238720 A1 | 10/2008 | Lee | |
| 2008/0246631 A1 | 10/2008 | Kavaler | |
| 2008/0287144 A1 | 11/2008 | Sabata et al. | |
| 2010/0017102 A1 | 1/2010 | Kavaler et al. | |
| 2010/0017103 A1 | 1/2010 | Kwong et al. | |
| 2010/0017104 A1 | 1/2010 | Kwong et al. | |
| 2010/0019936 A1 * | 1/2010 | Kaveler | G08G 1/042 340/933 |
| 2010/0073154 A1 | 3/2010 | Kim et al. | |
| 2011/0121995 A1 | 5/2011 | Zettergren et al. | |
| 2011/0158331 A1 | 6/2011 | Kavaler et al. | |
| 2012/0026013 A1 | 2/2012 | Fuller et al. | |
| 2012/0134237 A1 | 5/2012 | Esteban-Campillo et al. | |
| 2012/0173171 A1 | 7/2012 | Bajwa et al. | |
| 2013/0336223 A1 * | 12/2013 | Huang | H04W 4/005 370/328 |
| 2015/0046075 A1 | 2/2015 | Neel et al. | |

FOREIGN PATENT DOCUMENTS

| | | |
|---|---|---|
| JP | 09210721 | 8/1997 |
| JP | 2002298286 | 11/2002 |
| JP | 2007188340 | 7/2007 |
| KR | 100820467 | 4/2008 |

OTHER PUBLICATIONS

Michael J. Caruso and Lucky S. Withanawasam, Vehicle Detection and Compass Applications Using AMR Magnetic Sensors, 1999, Honeywell, SSEC, Plymouth, MN. (13 pages).

Ben W. Cook, Axel D. Berny, Alyosha Molnar, Steven Lanzisera and Kristofer S. J. Pister, An Ultra-Low Power 2.4GHz RF Transceiver for Wireless Sensor Networks in 0.13μm CMOS with 400mV Supply and an Integrated Passive RX Front-End, 2006, Berkeley, CA. (10 pages).

Ben W. Cook, Alyosha Molnar and Kristofer S. J. Pister, Low Power RF Design for Sensor Networks, 2005, pp. 357-360, Berkeley, CA. (4 pages).

Susan Cotterell, Kelly Downey and Frank Vahid, Applications and Experiments with eBlocks—Electronic Blocks for Basic Sensor-Based Systems, 2004, University of California, Riverside. (9 pages).

David E. Culler and Wei Hong, Wireless Sensor Networks, Comm. of ACM, Jun. 2004/vol. 47, No. 6, pp. 30-33, Berkeley, CA. (4 pages).

Jason Hill, Mike Horton, Ralph Kling and Lakshman Krishnamurthy, The Platforms Enabling Wireless Sensor Networks, Comm. of ACM, Jun. 2004/vol. 47, No. 6, pp. 41-46. (6 pages).

Seth Edward-Austin Hollar, A Solar-Powered, Milligram Prototype Robot from a Three-Chip Process, 2003, Berkeley, CA. (132 pages).

Seth Edward-Austin Hollar, COTS Dust, 2000, Berkeley, CA. (96 pages).

(56) References Cited

OTHER PUBLICATIONS

Honeywell, 1, 2 and 3 Axis Magnetic Sensors HMC1051/HMC1052/HMC1053, 2006, Honeywell International, Inc., Plymouth, MN. (12 pages).
Honeywell, Vehicle Detection Using AMR Sensors, 2005, Honeywell International, Inc., Plymouth, MN. (10 pages).
Joseph M. Kahn, Randy Howard Katz, and Kristofer S. J. Pister, Emerging Challenges: Mobile Networking for "Smart Dust," 2000, pp. 188-196, Berkeley, CA. (9 pages).
J. M. Kahn, R. H. Katz and K. S. J. Pister, Next Century Challenges: Mobile Networking for "Smart Dust," Conference Proceeding 1999, Berkeley, CA. (8 pages).
Bharat B. Pant, Magnetic Sensor Cross-Axis Effect, 1996, Honeywell International, Inc., Plymouth, MN. (6 pages).
Adrian Perrig, John Stankovic and David Wagner, Security in Wireless Sensor Networks, Comm. of ACM, Jun. 2004/vol. 47, No. 6, pp. 53-57. (5 pages).
Michael D. Scott, Bernhard, E. Boser and Kristofer S. J. Pister, An Ultra-Low Power ADC for Distributed Sensor Networks, 2002, Berkeley, CA. (4 pages).
Robert Szewczyk, Eric Osterwill, Joseph Polastre, Michael Hamilton, Alan Mainwaring and Deborah Estrin, Habitat Monitoring With Sensor Networks, Comm. of ACM, Jun. 2004/vol. 47, No. 6, pp. 34-40. (7 pages).
Brett A. Warneke, Michael D. Scott, Brian S. Leibowitz, Lixia Zhou, Colby L. Bellew, J. Alex Chediak, Joseph M. Kahn, Bernhard E. Boser and Kristofer S. J. Pister, 49.4 an Autonomous 16 mm3 Solar-Powered Node for Distributed Wireless Sensor Networks, 2002 IEEE, pp. 1510-1515, Berkeley, CA. (6 pages).
Brett A. Warneke and Kristofer S. J. Pister, Exploring the Limits of System Integration with Smart Dust, 2002 by ASME, Berkeley, CA. (5 pages).
Brett A. Warneke and Kristofer S. J. Pister, MEMS for Distributed Wireless Sensor Networks, 2002 IEEE, pp. 291-294, Berkeley, CA. (4 pages).
Brett A. Warneke, Matt Last, Brian S. Leibowitz and Kristofer S. J. Pister, Smart Dust: Communicating with a Cubic-Millimeter Computer, 2001 IEEE, Berkeley, CA. (8 pages).
Brett A. Warneke, Bryan Atwood and Kristofer S. J. Pister, Smart Dust Mote Forerunners, Proceedings of the 14th IEEE International Conference on Micro Electro Mechanical Systems (MEMS 2001), Interlaken, Switzerland, Jan. 21-25, 2001, Berkeley, CA. (4 pages).
Alec Woo, Sam Madden and Ramesh Govindan, Networking Support for Query Processing in Sensor Networks, Comm. of ACM, Jun. 2004/vol. 47, No. 6, pp. 47-52. (6 pages).
David Beymer, Philip Mclauchlan, Benn Coifman, and Jitendra Malik, A Real-time Computer Vision System for Measuring Traffic Parameters, 1997 IEEE, pp. 495-501, Berkeley, CA. (7 pages).
Linx Technologies, HP Series-II Transmitter Module Design Guide, 1999 by Linx Technologies, Inc. (16 pages).
Lockheed Martin Federal Systems, Odetics Intelligent Transportation Systems Division, Prepared for Federal Highway Administrations, US Department of Transportation, Washington, D.C., Dec. 1999. (26 pages).
Ara N. Knaian, A Wireless Sensor Network for Smart Roadbeds and Intelligent Transportation Systems, 2000 Massachusetts Institute of Technology. (51 pages).
Joe Palen, The Need for Surveillance in Intelligent Transportation Systems, vol. 6 No. 2,1997, Intellimotion—Path Publications, Richmond, CA. (20 pages).
David Schrank and Tim Lomax, The 1999 Annual Mobility Report, Information for Urban America, Texas Transportation Institute, The Texas A&M University System. (123 pages).
Carlos Sun, Intelligent Surveillance Using Inductive Vehicle Signatures, Intellimotion, vol. 8, No. 3, Mar. 1999. (7 pages).
Graham-Rowe, D., Danger, Hazard ahead!, New Scientist, vol. 160, No. 2160, Nov. 14, 1998. (2 pages).
International Search Report and Written Opinion for PCT Application No. PCT/US14/19616, dated Jul. 29, 2014. (7 pages).
International Search Report and Written Opinion for PCT Application No. PCT/US14/19631, dated Jul. 25, 2014. (8 pages).

\* cited by examiner

WIRELESS VEHICLE DETECTION SYSTEM AND ASSOCIATED METHODS HAVING ENHANCED RESPONSE TIME

RELATED APPLICATIONS

The present application is a continuation application which claims priority to and the benefit of U.S. Non-Provisional patent application Ser. No. 14/475,916, titled, "Wireless Vehicle Detection System and Associated Methods Having Enhanced Response Time," filed on Sep. 3, 2014, which is a continuation of U.S. Non-Provisional patent application Ser. No. 14/194,162, titled, "Wireless Vehicle Detection System and Associated Methods Having Enhanced Response Time," filed on Feb. 28, 2014, now U.S. Pat. No. 8,855,902, issued Oct. 7, 2014, which claims priority and benefit to provisional application No. 61/770,606, titled, "Wireless Vehicle Detection System and Associated Methods Having Enhanced Response Time," filed on Feb. 28, 2013; application No. 61/770,789, titled, "Wireless Vehicle Detector Aggregator and Interface to Controller and Associated Methods," filed on Feb. 28, 2013; and application No. 61/770,951, titled "Wireless Vehicle Detection System, Sensor Pods, and Associated Methods," filed on Feb. 28, 2013, each of which is incorporated herein by reference in its entirety. This application is also related to U.S. patent application Ser. No. 14/194,280, titled "Wireless Vehicle Detector Aggregator and Interface to Controller and Associated Methods," filed on Feb. 28, 2014, which is also incorporated herein by reference in its entirety.

FIELD OF THE INVENTION

The present invention relates to vehicle detection systems and, more particularly, wireless vehicle detection systems and methods associated with detecting vehicles on roadways or other travel surfaces.

BACKGROUND

Currently offered wireless detection systems are cumbersome and expensive, with various components communicating over the same RF channel, and with a relatively short RF communication range. An average sized traffic intersection, for example, requires multiple repeaters to communicate to the various in-road wireless vehicle sensors. This configuration makes the entire system expensive to install, thereby reducing the opportunities for using vehicle detection technology.

Moreover, current wireless vehicle detection systems use wired communication from the access point to the controller cabinet. Inside of the controller cabinet, connections are made through a detector rack using cables and multiple printed circuit boards; usually two or four per card. Connecting large numbers of detector signals can be cumbersome and costly.

SUMMARY OF INVENTION

Applicants recognized problems associate with current vehicle detection systems and methods including needs for lower cost, more reliable and easy to install, i.e. minimum lane closure time during installation, among others. Embodiments of wireless vehicle detection systems and associated methods of the present invention address these problems with eloquent solutions including, for example, a flexible vehicle detection system with a simplified architecture. Embodiments of the wireless vehicle detection systems reduce if not eliminate the need for repeaters. Embodiments of the present invention, for example, provide systems and methods having sensors able to communicate over longer distances, which allow repeaters to be eliminated for intersections, if desired, and still maintain relatively long, e.g., 10 years, battery or other power source life. Embodiments of the invention are less-costly and more accurate and robust than current systems.

Embodiments can include one or more wireless sensor pods having a unique antenna with its radiating element close to the surface, the antenna having a radiation pattern and orientation that allows the sensor to transmit signals more than approximately 700 feet, for example, to an access point. To conserve power usage, an embodiment of the sensor pod is adapted to detect received communication signal strength, and operationally adapted to adjust transmitting power based upon said strength. According to embodiments of the invention, the sensor pod can include, for example, a vehicle detector controller adapted to determine the presence of one or more vehicles, and a communication controller connected to the vehicle detector and adapted to transmit data 700 feet or more away from the sensor pod, the data relating to the detected presence of one or more vehicles. The vehicle detector controller and the communication controller each having separate clock cycles and separately controlled sleep cycles for drawing power according to an embodiment of the sensor pod. The sensor pod can further include, for example, a battery sufficiently large to support transmit power sufficient to achieve a transmission range of 300 feet or more and a hybrid layer capacitor connected in parallel electrically to the battery to protect the battery from degradation at transmit power levels to thereby extend the life of the battery. To fit in the enclosure of the sensor pod, embodiments of the invention include a low profile antenna of the pod positioned in a substantially horizontal orientation when positioned inside an enclosure of the sensor pod and near a top end of the enclosure when the sensor pod is positioned in or below the surface of the road, the antenna is adapted to allow for and support a 902-928 MHz ISM radio frequency band. The low profile antenna can also have an antenna housing having a hollow interior to allow communication circuitry components to be mounted at least partially inside the antenna housing thereby decreasing vertical space requirements inside of the enclosure of the sensor pod according to an embodiment of the invention.

Embodiments of the wireless vehicle detection system can further include, for example, a base station adapted to provide processing and storage for the wireless vehicle detection system and an access point adapted to communicate with the base station wireless at a communication frequency of approximately 2.4 GHz or via one or more wires, and further adapted to communicate with the one or more sensor pods at a communication frequency of approximately 902-928 Mhz.

Embodiments of the invention can be used for a plurality of traffic zones, each zone including, for example, an access point in communication with a sensor pod. Embodiments of the access point can include, for example, a sensor state aggregator module adapted to maintain current detect status of the one or more sensor pods in a respective zone, the sensor state aggregator comprising a set of instructions that causes the access point, when executed by a access point controller, to perform the operation of generating a first sensor state array, each of the one or more sensor pods in the respective zone having an entry in the sensor state array. The operations according to an embodiment of the invention can further include, for example, updating the sensor state array responsive to receiving one or more signals from the one or more sensor pods in the respective zone, the one or more signals including current detect status of the one or more sensor pods. The access point is adapted to communicate with the base station. Accordingly, embodiments of the sensor state aggregator module associated with the access point can further include, communicating, to the base station, an output message indicating a time stamp and event trigger details responsive to receiving an individual status message from one or more of the sensor pods responsive to an event trigger, and communicating the updated sensor state array indicating current detect status of the one or more sensor pods upon demand or after a predetermined time period.

Embodiments of the base station can be adapted to provide data processing and storage for the wireless vehicle detection system. The base station can include, for example, a base station controller, a bus interface unit emulator, and a traffic detector aggregator module adapted to aggregate data from the plurality of access points so that a user can configure and monitor the wireless vehicle detection system. An embodiment of the traffic detector aggregator module comprises a set of instructions that causes the base station, when executed by the base station controller for example, to perform the operation of generating a second sensor state array, each of the one or more sensor pods in all of the zones having an entry in the sensor state array. The operations can further include, for example, updating the second sensor state array responsive to receiving updated sensor state array from one of the plurality of access points, generating a vehicle detector array, the vehicle detector array comprising information indicating a physical detector input for each of the zones of and time stamps of event triggers, and updating the vehicle detector array responsive to receiving the output message from one of the plurality of access points.

Embodiments of a sensor pod provide extended communication range to allow an access point to talk to all or almost all sensors in an intersection without the need of repeaters. Embodiments of a wireless vehicle detection system provide a relatively low cost, easy to install and flexible wireless vehicle detection system and associated methods.

Embodiments of aggregators, controllers, systems and methods of the present invention, for example, aggregate sensor detect status at the access point and relay that information to a base station periodically by wire or wirelessly. Inside of the controller cabinet assembly, a base station unit aggregates and combines sensor status data into detector output data according to an embodiment of the invention. Additionally, the base station controller and SDLC interface circuitry can emulate bus interface units such that, for example, up to 128 detector outputs can be provided through a single SDLC cable and without need for any additional printed circuit boards or their associated special cables.

Embodiments of the system can include, for example, a plurality of access points adapted to communicate with one or more sensor pods in a plurality of zones, each zone having at least one sensor pod in communication with at least one of the plurality of access points. An embodiment can include, for example, a plurality of access points in a traffic intersection. Embodiments of the access point can include, for example, an access point controller including a sensor state aggregator module adapted to maintain current detect status sensor pods in a zone. The sensor state aggregator, according to an embodiment of the invention, can cause the access point to perform the operations of generating a first sensor state array, each of the one or more sensor pods in the respective zone having an entry in the sensor state array and updating the sensor state array responsive to receiving one or more signals from the one or more sensor pods in the respective zone, the one or more signals including current detect status of the one or more sensor pods. Embodiments of the invention can cause the access point to perform the operations of communicating an output message indicating a time stamp and event trigger details responsive to receiving an individual status message from one or more of the sensor pods responsive to an event trigger, and communicating the updated sensor state array indicating current detect status of the one or more sensor pods upon demand or after a predetermined time period.

Embodiments of the system can further include, for example, a base station adapted to provide data processing and storage for the wireless vehicle detection system. The base station can comprise a base station controller and one or more non-transitory memories encoded with one or more computer programs operable by the base station controller. The one or more computer programs, according to an embodiment of the invention, can include a traffic detector aggregator module adapted to aggregate data from the plurality of access points so that a user can configure and monitor the wireless vehicle detection system. The traffic detector aggregator module comprising, for example, a set of instructions that causes the base station, when executed by the base station controller, to perform the operation of generating a second sensor state array, each of the one or more sensor pods in all of the zones having an entry in the sensor state array, and updating the second sensor state array responsive to receiving updated sensor state array from one of the plurality of access points. The operations adapted to be performed by the base station can further include, for example, generating a vehicle detector array, the vehicle detector array comprising information indicating a physical detector input for each of the zones of and time stamps of event triggers and updating the vehicle detector array responsive to receiving the output message from one of the plurality of access points. Embodiments of the base station can further include, for example, one or more bus interface unit (BIU) emulators adapted to be in communication with a SDLC Interface, the SDLC interface being in communication with a traffic controller so that the BIU emulator is responsive to the traffic controller

BRIEF DESCRIPTION OF DRAWINGS

So that the manner in which the features and advantages of the invention, as well as others, which will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope, which may include other effective embodiments as well.

DETAILED DESCRIPTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art.

Embodiments of the present invention include a wireless vehicle detection system having an extended range that eliminates or at least reduces the number of repeaters needed. An average sized traffic intersection using current vehicle detection systems requires multiple repeaters to communicate with current vehicle detection sensors. Embodiments of the present invention include, for example, one or more wireless sensor pods having extended range and battery life that enables the wireless vehicle detection system according to embodiments of the present invention to communicate over long distances for a number of years (e.g., five years or more) without repeaters. Embodiments of the invention provide, for example, enhanced response times and lower latency by providing sensor pods that are adapted to communicate directly with access points over long distances (e.g., 300 feet or more). Embodiments of the present invention provide a cost-effective wireless detection system for a broad range of transportation needs.

Figure 1:
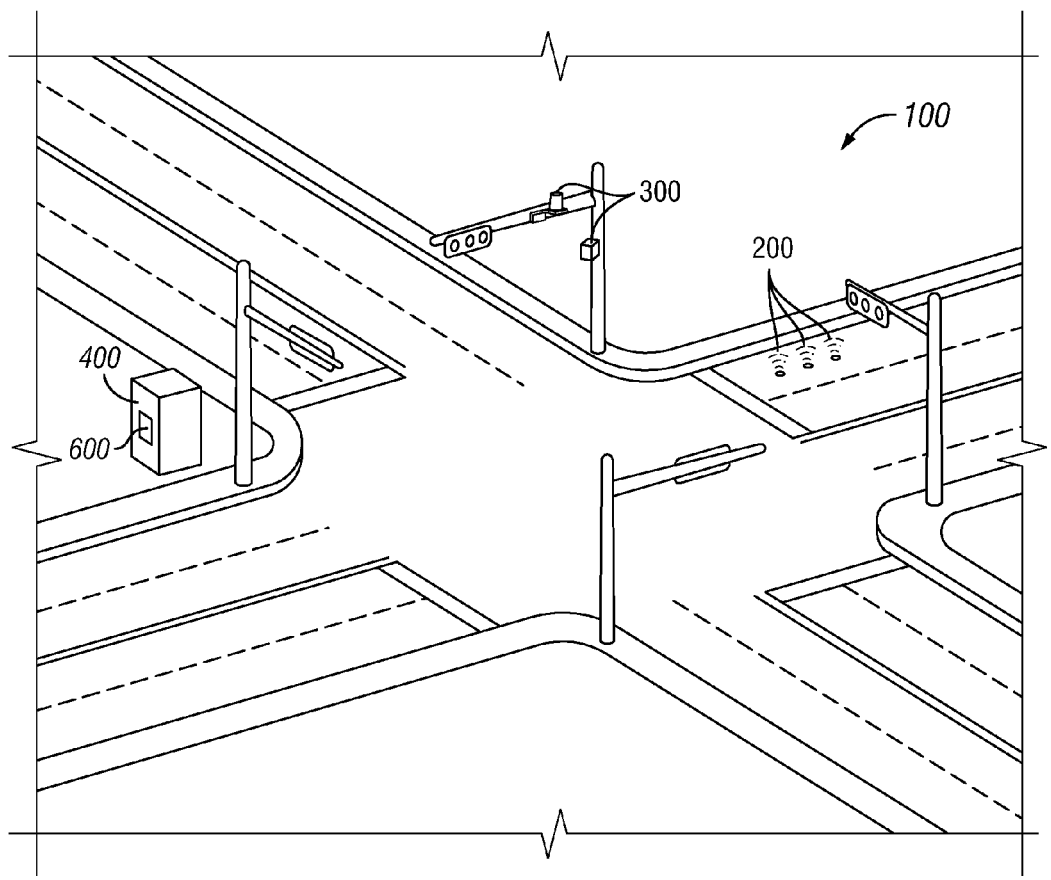
FIG. 1 illustrates an environmental view of the wireless vehicle detection system according to an embodiment of the invention.

As illustrated in FIG. 1, the vehicle detection system 100 can include a plurality of wireless sensor pods 200 adapted to detect the presence of a vehicle and positioned in or below the road surface, an access point 300 mounted to a traffic pole and adapted to receive data sensed by the sensor pods, and a base station 400 positioned within a traffic controller cabinet 600 to provide data signal processing.

Figure 2:
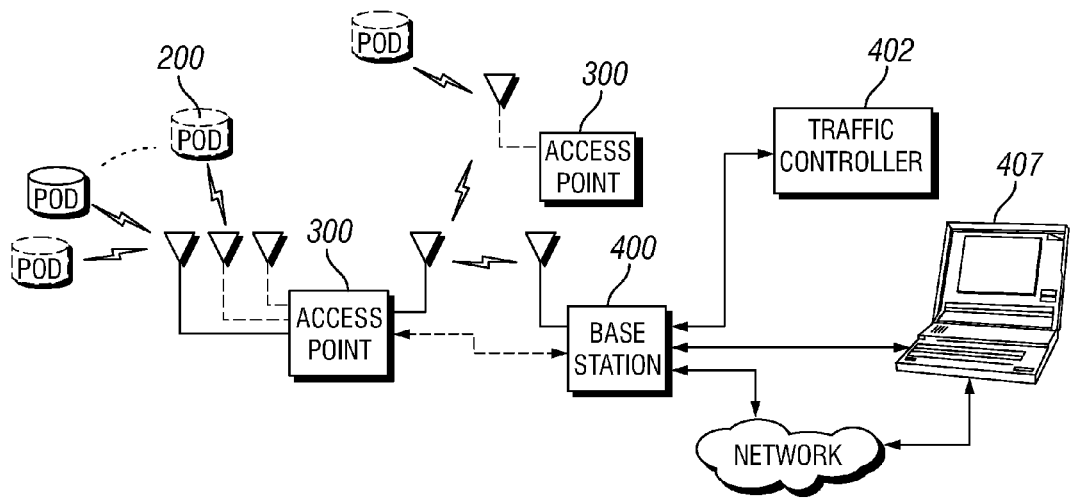
FIG. 2 illustrates a schematic diagram of the wireless vehicle detection system according to an embodiment of the invention.

As illustrated in FIG. 2, embodiments of vehicle detection system 100 can include a plurality of access points 300 each adapted to communicate with one or more sensor pods 200 in a traffic region zone. According to an embodiment of present invention, each zone includes at least one sensor pod 200 in communication with one of the plurality of access points 300. Each access point 300 is adapted to communicate with up to 130 sensor pods 200 in a zone according to an embodiment of the present invention. The base station 400 can be adapted to provide data processing and storage for the wireless vehicle detection system and be connected to a WAN or LAN network and a traffic controller 402 as understood by those skilled in the art. Embodiments of the wireless vehicle detection system 100 enable a user to configure or monitor the vehicle detection system 100 using a remote device 407.

Figure 3:
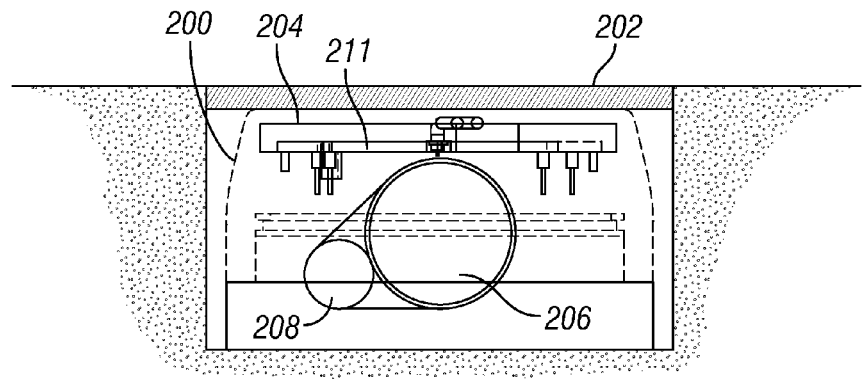
FIG. 3 illustrates an environmental view of a sensor pod installed in a road surface according to an embodiment of the invention.

FIG. 3 illustrates a sensor pod 200 installed below a road surface. Embodiments of the sensor pod 200 can include, for example, an antenna 204 adapted to communicate with the access point 300, a PC board 211 where one or more electronic hardware components attach thereto, a battery 206, and a hybrid layer capacitor (HLC) 208 connected in parallel electrically to the battery 206 to protect the battery from degradation as understood by those skilled in the art.

Embodiment of the present invention provides for simple installation of the sensor pods 200 with minimal road closure duration. A small hole can be cut in the road using, for example, a diamond tipped drill bit or other suitable drilling or cutting apparatus as understood by those skilled in the art. According to an example embodiment, the hole is approximately two and half inches deep and four to four and half inches in diameter. After the hole is drilled, a shop vacuum can be used to remove debris and a propane torch can be used to dry out the hole before the adhesive is used. Epoxy or adhesive is placed in the bottom of the hole and the sensor pod is positioned inside the hole and in the adhesive. According to some embodiments, the remaining void of the hole is filled with adhesive or sealant and topped with a sealant 202 that is leveled with the surface of the road. A top end of the enclosure of the sensor pod 200 can be positioned such that the top surface is near the roadway surface. This allows, as illustrated in FIG. 3 for example, for the antenna 204 positioned inside the enclosure of the sensor pod to be near the surface of the road. According to an example embodiment, the sensor pod 200 is positioned approximately 3/8 of an inch from the roadway surface. The radiation pattern of the antenna enables efficient communication with the access point 300 when the antenna 204 is positioned inside the enclosure of the pod and installed below the surface of the road according to an embodiment of the invention.

Figure 4:
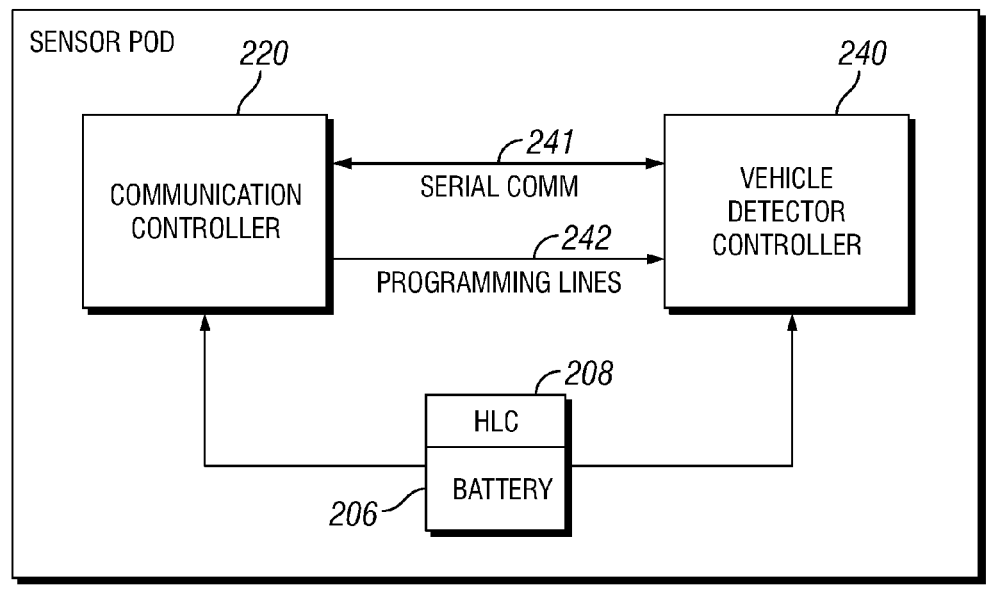
FIG. 4 illustrates a schematic block diagram of a sensor pod according to an embodiment of the invention.

As illustrated in FIG. 4, embodiments of the sensor pod can include a vehicle detector controller 240 adapted to detect the presence of a vehicle and a communication controller 220 adapted to communicate data relating to the presence of one or more vehicles to the access point 300. The vehicle detector controller 240 and the communication controller 220 can be connected by a serial communication link 241 such as SPI, UART, or other communication links as understood by those skilled in the art. One or more program lines 242 can also be used to connect or control the two controllers 220, 240. According to an embodiment of the present invention, the vehicle detector controller 240 and the communication controller 220 each have separate clock cycles and separately controlled sleep cycles for drawing power. The battery 206 of the sensor pod is large enough to support transmit power sufficient to achieve at least 300 feet or more. In an example embodiment, the battery 206 is a lithium thionylchloride, compact D size and is capable of storing a substantial charge for several years. The battery 206 can provide power to the sensor pod 200 for up to 10 years with an average of 700 activation per hour, twenty four hours a day, every day of the week and can be replaced as needed according to an embodiment of the invention. In some embodiments, the battery life is up to 5 years. According to various embodiments of the present invention, the battery 206 is electrically connected in parallel to one or more HLC capacitors 208 to support high current operations. As understood by those skilled in the art, the HLC capacitor 208 also protects the battery 208 from degradation at transit power by reducing the load on the battery and thereby extends the life of the battery 206.

An embodiment of the sensor pod 200 has the capability to transmit at a high power of approximately 20 dBm to the access point 300. Together the communication controller 220 and vehicle detector controller 240 manage the power from the power source. The HLC capacitor 208 electrically attached in parallel to the battery allows for high current draw which supports the high power radio transmissions. One or both of the controllers 220, 240 are adapted to detect the signal strength of a received signal from the access point 300 and adjusting the transmitting power based upon that strength such that power is conserved, thereby lengthening battery life. An embodiment of the sensor pod 200, for example, provides extended range features that allow the pod to communicate with the access point 300 without repeaters and with a long battery life.

Figure 5:
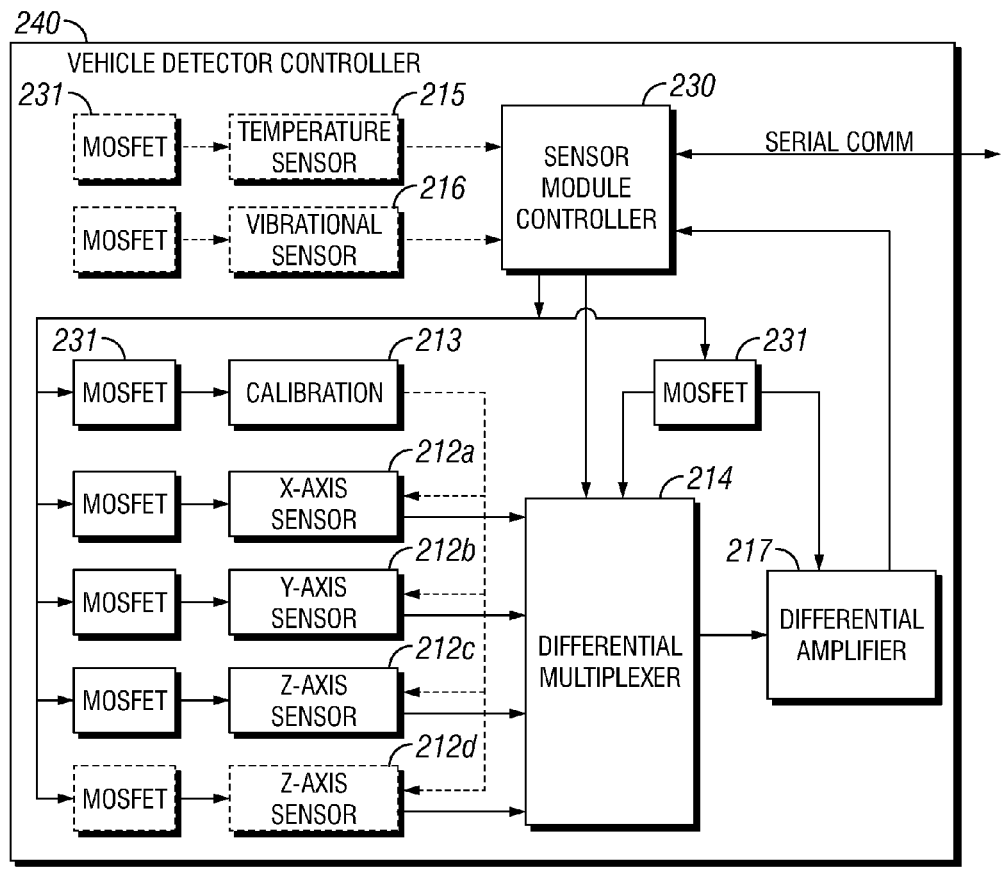
FIG. 5 illustrates a schematic block diagram of a vehicle detector controller according to an embodiment of the invention.

FIG. 5 illustrates an embodiment of the vehicle detector controller 240 that is adapted to sense parameters for detecting vehicles, measuring vehicle occupancy, counting the number of detected vehicles, detecting parameters for speed calculations, and other parameters for a broad range of transportation and traffic applications.

An embodiment of the vehicle detector controller 240 can include, for example, a plurality of Anisotropic Magneto-Resistive based magnetic sensors 212a-d adapted to sense parameters of vehicles. Vehicles contain ferrous materials that disturb the uniform intensity and direction of the Earth's magnetic field. Embodiments of the sensor pods 200 may include one or more magnetic sensors 212 to detect disturbances of the Earth's magnetic field created by a vehicle (e.g., car, truck, or motorcycle). In some embodiments, one or more of the plurality of magnetic sensors 212 may act as redundant sources of vehicle detection in the event that a magnetic sensor fails. As illustrated in FIG. 5, the vehicle detector controller 240 may include a x-axis magnetic sensor 212a, a y-axis magnetic sensor 212b, and a z-axis magnetic sensor 212c. In certain embodiments, the vehicle detector controller 240 may include two z-axis magnetic sensors 212c, 212d spaced apart in a single sensor pod to calculate the speed of a passing vehicle. The dual sensors 212c, 212d may also act as redundant sensors if one of the sensors fails to operate properly. In other embodiments the dual magnetic sensors may be two y-axis or x-axis sensors, or a combination of the x, y, or z-axis sensors. With dual placed magnetic sensors, the first magnetic sensor will experience a detection of the passing vehicle a fraction of a second before the second sensor in moving traffic. With a predetermined displacement distance between two magnetic sensors and time measurement between the two magnetic sensors, a speed computation can be made using a single sensor pod. In some embodiments, a plurality of sensor pods 200 can be placed at a predetermined displacement distance and used to calculate the speed of a passing vehicle. Speed computation can be performed by the sensor module controller 230 in the vehicle detector controller 240 or by one or more remote devices that receive data sensed by the sensor pod 200. The sensor module controller 230 can also receive sensed data from one or more temperature 215 and vibration 216 sensors and process the sensed data to determine, for example, the presence of ice, snow, water or temperature measurements. Signal processing functions of the sensor module controller 230 may also include characterizing sensed vibrations data to facilitate the detection and classification of a vehicle.

The sensor module controller 230 can further be adapted to determine if one or more of the magnetic sensors 212 are operating within satisfactory limits and generate a signal or alarm if the one or more sensors are not operating satisfactory. This signal or alarm can be based on historical measured values of the sensors. The signal or alarm can be transmitted to the base station 400 or the traffic controller 402 for further action by field personnel for example.

Embodiments of the vehicle detector controller 240 may also include a calibration module 213 adapted to adjust for sensor offset, or to set or reset one or more of the plurality of magnetic sensors 212. The vehicle detector controller 240 may also utilize one or more power control devices such as MOSFETs 231 to intermittently supply power to different circuitry components including the plurality of magnetic sensors 212. According to an embodiment of the present invention, the output of the plurality of magnetic sensors 212 is routed through a differential multiplexer 214 and then passed to a fast respond differential amplifier 217. The output of the amplifier 217 is routed to the sensor module controller 230, which is adapted to perform signal processing according to an embodiment of the invention.

The sensor module controller 230 can process sensed data to determine, for example, the presence of a vehicle, count the number of detected vehicles, and the speed of passing vehicles. In some embodiments, the sensor module controller 230 gathers the sensed data from the magnetic sensors 212 and transmits the data for the base station 400, or traffic controller 402 to process the sensed data and determine the presence of a vehicle and other traffic parameters. The sensor module controller 230 can further include an analog to digital converter to convert the signal received from the differential amplifier 217 to digital info ration. The sensor module controller 230 can be further adapted to communicate with the communication controller 220, which is adapted to relay information to and from the access point 300.

Figure 6:
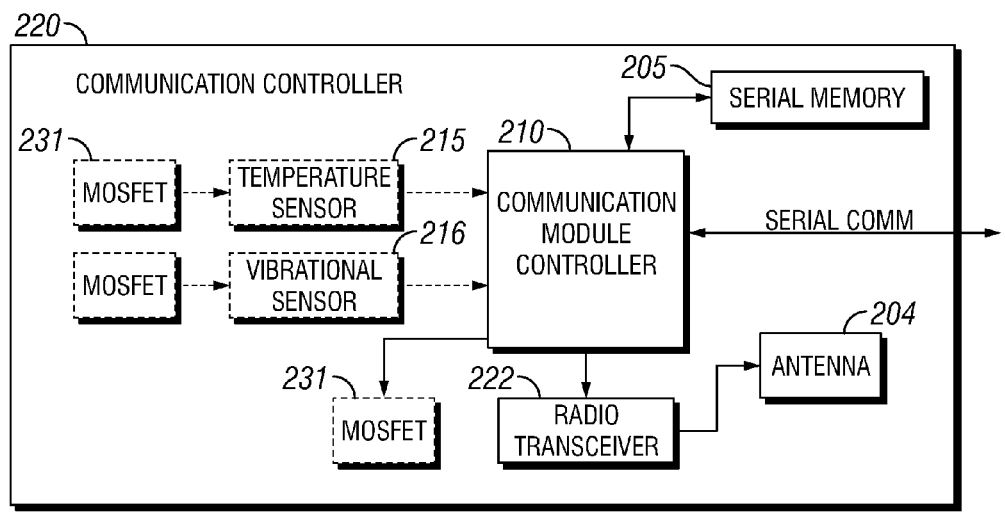
FIG. 6 illustrates a schematic block diagram of a communication controller according to an embodiment of the invention.

As illustrated in FIG. 6, the communication controller 220 can include one or more of a radio transceiver 222, an antenna 204, a serial memory 205, a communication module controller 210 and a MOSFET 231 or other power control device. According to an embodiment of the present invention, the communication controller 220 is adapted to receive signals from the vehicle detector controller 240 and generate a packet suitable to be wirelessly transmitted to the access point 300. The communication controller 220 can also perform overhead functions for the sensor pod 200 including, for example, the timing and synchronization of communicating data signals, and data formatting. One or more of the foregoing functions can be performed by the communication module controller 210 according an embodiment of the present invention. The communication module controller 210 can also receive sensed data from one or more temperature 215 and vibration 216 sensor and process the sensed data to determine, for example, the presence of ice, snow, water or temperature measurements. A serial memory 205, as understood by those skilled in the art, can also be used to facilitate remote firmware upgrades to the sensor pods 200. The memory, according to an embodiment, is non-transitory and may store one or more computer programs to be executed by the communication module controller 210 or the sensor module controller 230 for example.

The radio transceiver 222 of the communication controller 220 is configured to communicate in the 902-928 Mhz ISM band according to an embodiment of the invention. In other embodiments, the radio transceiver 222 is configured to communicate in the 433-435 MHz ISM band, or both the 433-435 MHz and the 902-928 Mhz ISM band for example. An operating frequency in the 902-928 Mhz ISM or 433-434 MHz ISM band provides a greater communication range than the operating frequency of 2.4 Ghz, for example because the 2.4-2.5 Ghz ISB band typically has greater pass losses. Also, the airways of the 2.4-2.5 Ghz ISB band are more crowded than the 902-928 Mhz ISB because the 2.4-2.5 Ghz ISB band includes RF signals from common devices such as Wi-Fi hubs, and Bluetooth devices. A communication frequency of no more than 928 Mhz provides sufficiently low attenuation communication and range at the available power for the sensor pods according to embodiments of the invention. Although exemplary embodiments of the sensor pods 200 include one or more radio transceivers 222 adapted to operate at a frequency at or less than 928 Mhz, a 2.4 Ghz operating frequency is suitable for some components of the wireless vehicle system such as the radio communication between the base station 400 and the access point 300.

Antenna size is inversely proportional to the frequency and therefore, as understood by those skilled in the art, the size of an antenna operating at 900 Mhz is typically larger than an antenna operating at 2.4 Ghz. Embodiments of the sensor pod 200 can include an antenna 204 adapted to fit inside the enclosure of the sensor pod. The antenna 204 can be low profile and adapted to be positioned in a substantially horizontal orientation when positioned inside the enclosure of the sensor pod, as illustrated in FIG. 3 for example. The low profile antenna 204 can also have an antenna housing having a hollow interior to allow communication circuitry components to be mounted at least partially inside the antenna housing thereby decreasing vertical space requirements inside the enclosure of the sensor pod. In some embodiments the antenna 204 is a low profile loop antenna or a low profile patch antenna as understood by those skilled in the art.

Figure 13:
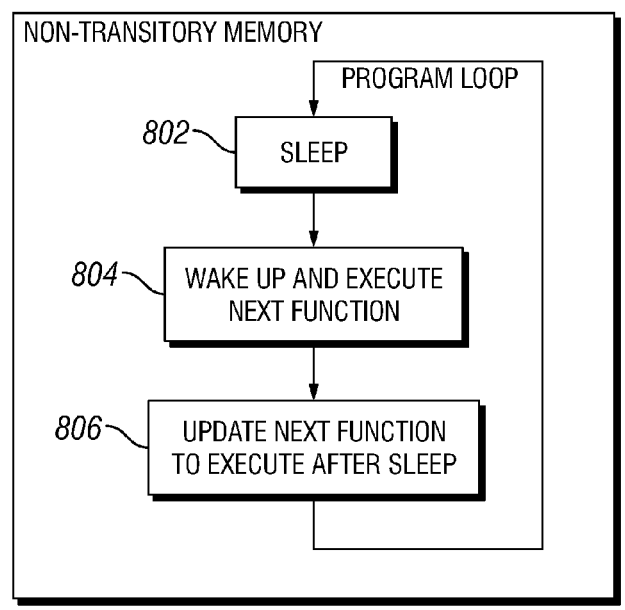
FIG. 13 illustrates flow chart depicting operation of methods associated with a wireless detection system according to an embodiment of the invention.

Embodiments of the sensor pod 200 can include a non-transitory memory having an executable program stored thereon to manage the power of the sensor pod. FIG. 13 illustrates an example embodiment of the instruction of a program loop executed by the sensor pod to manage power of the sensor pod. Both the vehicle detector and communication controllers 220, 240 spend most of the time in a power-saving sleep mode. Power management methods of embodiments of the invention enable the sensor pod 200 to run for a number of years without replacing the battery. The program loop instructions illustrated in FIG. 13 can be implemented on both the vehicle detector controller 240 and the communication controller 220 individually and in combination. In step 802, for example, the sensor pod will go into a low power sleep mode 802 for a predetermined amount of time. When the sensor pod wakes up, in step 804, for example, the controller executes the next function and then schedules a subsequent function in the chain to be executed in step 806 for example. According to an embodiment of the present invention, there is always one pending event or function to be executed by the sensor pod.

Figure 14:
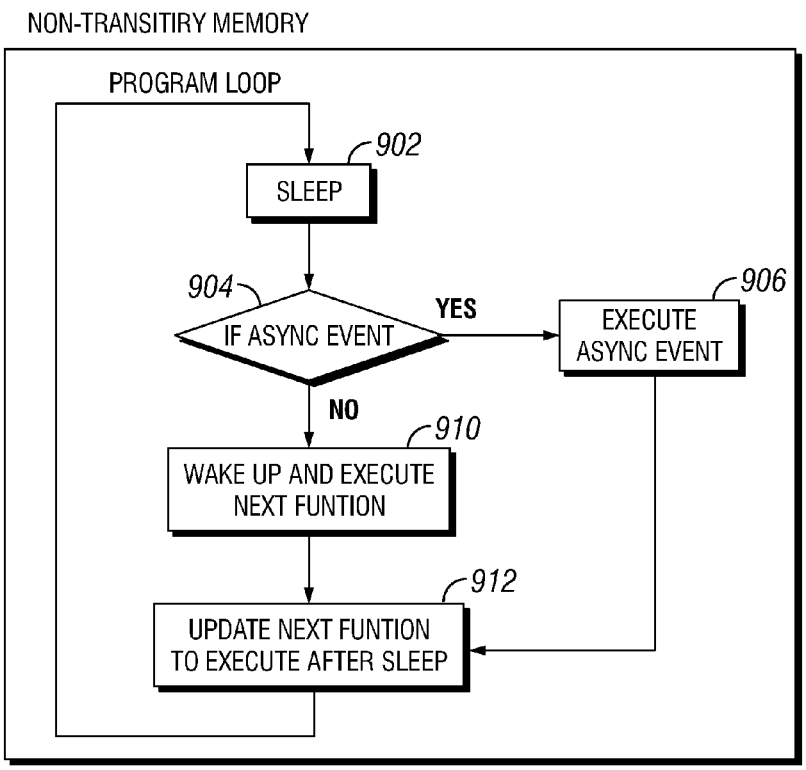
FIG. 14 is a flow chart depicting operation of methods for asynchronous events associated with a wireless vehicle detection system according to an embodiment of the present invention.

FIG. 14 example embodiment of the instruction of a program loop executed by the sensor pod to manage power of the sensor pod for an asynchronous event being triggered on the communication controller 220 as understood by those skilled in the art. In step 902, for example, the sensor pod will go into a low power sleep mode for a predetermined amount of time or until an event is triggered. When an event is triggered 904, the sensor pod wakes up from the low power sleep mode and executes the asynchronous event in step 906, and schedules a subsequent function in the chain to be executed in step 912. If an event is not triggered, such as in step 910, the pod remains sleep for a predetermined amount of time and then wakes up and executes the next function scheduled to be executed in step 910 and then schedules a subsequent function in the chain to be executed in step 912, for example. The above mentioned program loop implements an asynchronous event driven system for an embodiment of the wireless vehicle detection system and associated methods.

Figure 7:
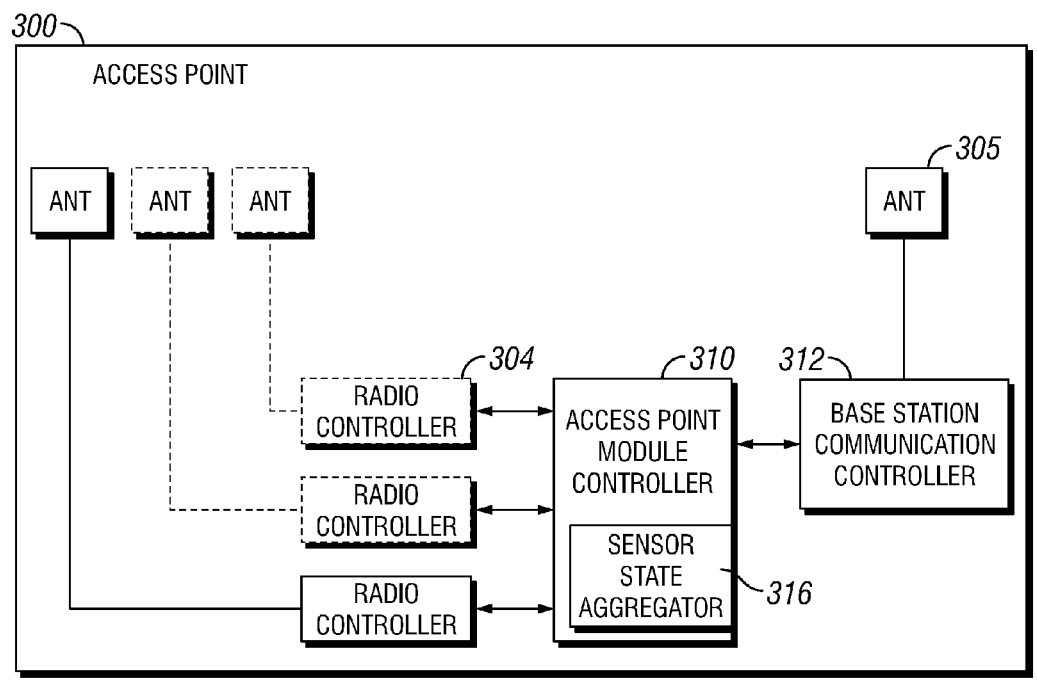
FIG. 7 illustrates a schematic block diagram of an access point according to an embodiment of the invention.

FIG. 7 illustrates a block diagram of an embodiment of an access point 300 that is adapted to communicate with a plurality of sensor pods 200 and a base station 400. A single access point 300 can communicate with up to 130 sensor pods according to an embodiment of the present invention. The wireless vehicle detection system can include the use of a plurality of access points 300 at a traffic intersection. As user of the wireless vehicle detector system can map zones to include one or more sensor pods and an access point 300. Embodiments of the access point 300 may include a plurality of radio controllers 304 adapted to communicate with sensor pods 200 at an operating frequency of approximately 900 Mhz, and one or more base station communication controllers 312 adapted to facilitate communication with the base station 400 at an operating frequency at approximately 2.4 Ghz using an antenna 305. Each radio controller 304 can talk to multiple sensor pods 200 using a low-power randomized-time-of-transmission TDMA protocol. The access point 300 can communicate with the base station by wire or wirelessly. According to an embodiment of the access point 300, a Zigbee radio module 312, as understood by those skilled in the art, is used to communicate wirelessly to the base station 400 and an RS-485 link, as understood by those skilled in the art, is used for wired communication. According to certain embodiments, all of the radio controllers 304 that are in communication with the sensor pods 200 are kept synchronized by the access point module controller 310. Synchronization allows the radio controllers to schedule transmission in the same time slots. This way, transmitting radios do not overload adjacent radio receivers. The access point module controller 310 is adapted to collect data from the plurality of radio controllers 304, aggregate the data, and transmit the data the base station 400 located in the traffic controller cabinet according to an embodiment of the invention.

Figure 8:
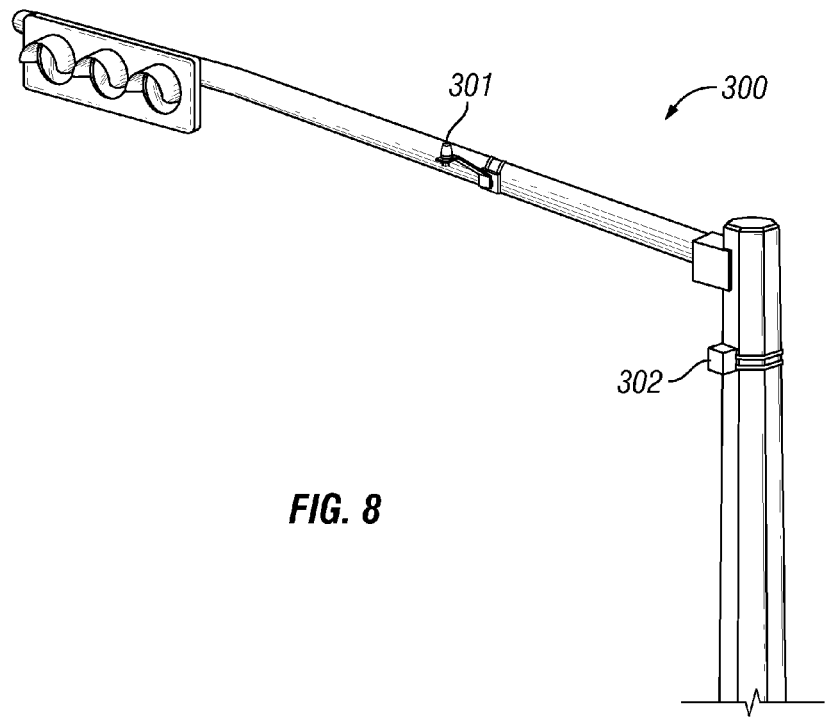
FIG. 8 illustrates the access point according to an embodiment of the invention.
Figure 10:
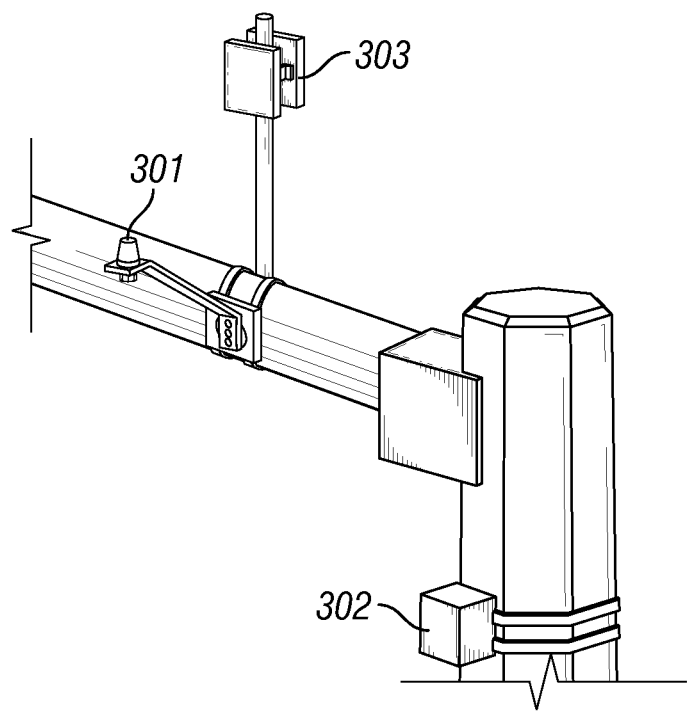
FIG. 10 illustrates the access point according to an embodiment of the invention.

Embodiments of the access point 300 may include one or more antennas 301, 303, positioned remotely from an access point housing 302 as illustrated in FIGS. 8 and 10, for example. The one or more antennas 301, 303 are adapted to be in communication with the plurality of sensor pods 200 and further adapted to communicate with the access point housing 302, which in turn communicates with the base station 400.

Figure 12:
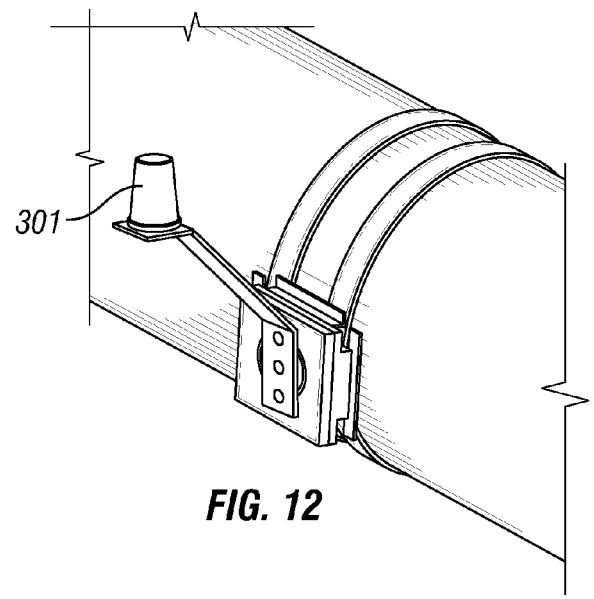
FIG. 12 illustrates an omnidirectional antenna according to an embodiment of the invention.

According to an embodiment of the present invention, the antenna can be an omnidirectional antenna 301, as understood by those skilled in the art, mounted to a traffic pole or mass arm at and within approximately 300 feet of the plurality of sensor pods 200 and at the operating frequency of approximately 900 Mhz. FIG. 12 illustrates the omnidirectional antenna 301 according to an embodiment of the invention. For traffic intersections that may require the sensor pods 200 to be approximately 300-700 feet from the access point 300, a combination of an omnidirectional antenna 301 and panel antennas 303 can be used as illustrated in FIG. 10 for example. In an example embodiment, the panel antennas 303 can communicate with the sensor pods 200 positioned 300-700 feet away and the omnidirectional antenna 301 can communicate with the sensor pods 200 positioned within 300 feet.

Figure 9:
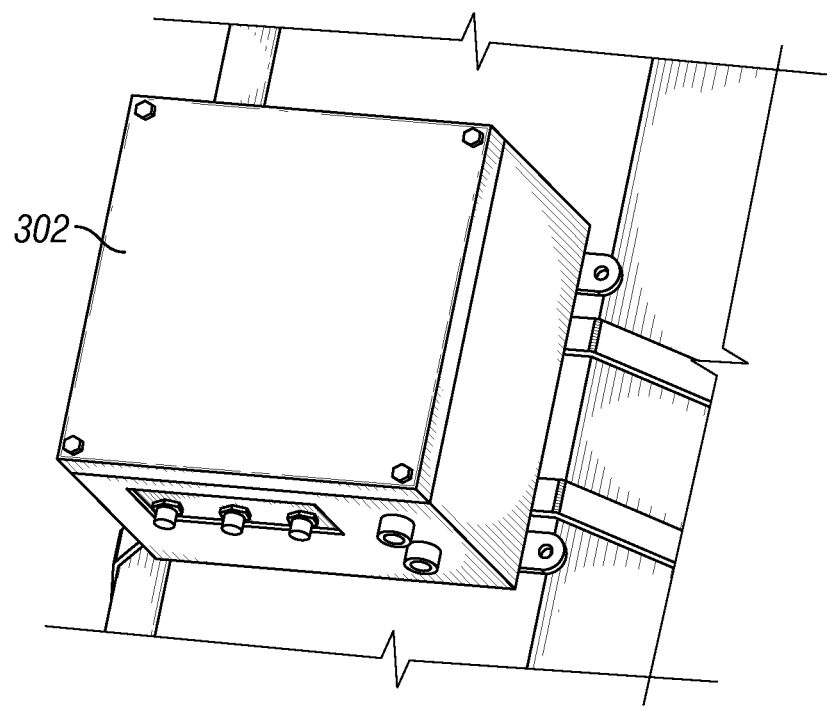
FIG. 9 illustrates the access point housing according to an embodiment of the invention.
Figure 11:
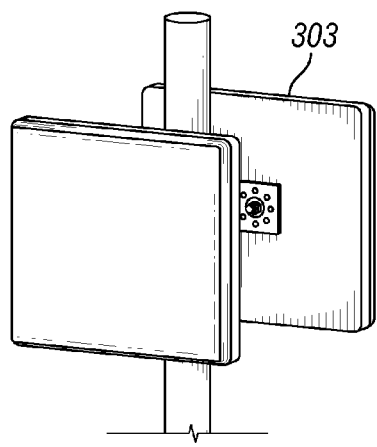
FIG. 11 illustrates a panel antenna according to an embodiment of the invention.

As illustrated in FIG. 11, according to an embodiment of the invention, the panel antenna 303 is a directional antenna with two panel antennas mounted a predetermined distance between each other and a pole positioned there between. One or more RF cables can be used to communicate data between the antennas 303, 301 and the access point housing 302. FIG. 9 illustrates an embodiment of the access point housing 302 according to an embodiment of the invention.

When selecting a mounting location for the access point 300, factors to be considered may include the elevation needed for RF communications, the line of sight to the traffic controller cabinet 600, the distance from the wireless sensor pods 200, and the accessibly of the mounted access point to field support personnel using a lift truck. The antennas 301, 303 can be mounted approximately 15-30 feet above ground, for example, on a traffic pole or mast arm and adjacent to the access point housing 302. The access point housing 302 can be placed in the line of site and close to the traffic controller cabinet 600 that houses the base station 400 according to an embodiment of the invention. When the access point and base station are communicating wirelessly, the access point 300 can receive approximately 120 VAC from an interface panel in the traffic controller cabinet 600 through a power cable connected there between. In other embodiments, the access point 300 receives power using the RS-485 link that is used for wired communication between the access point 300 and the base station 400.

Figure 20:
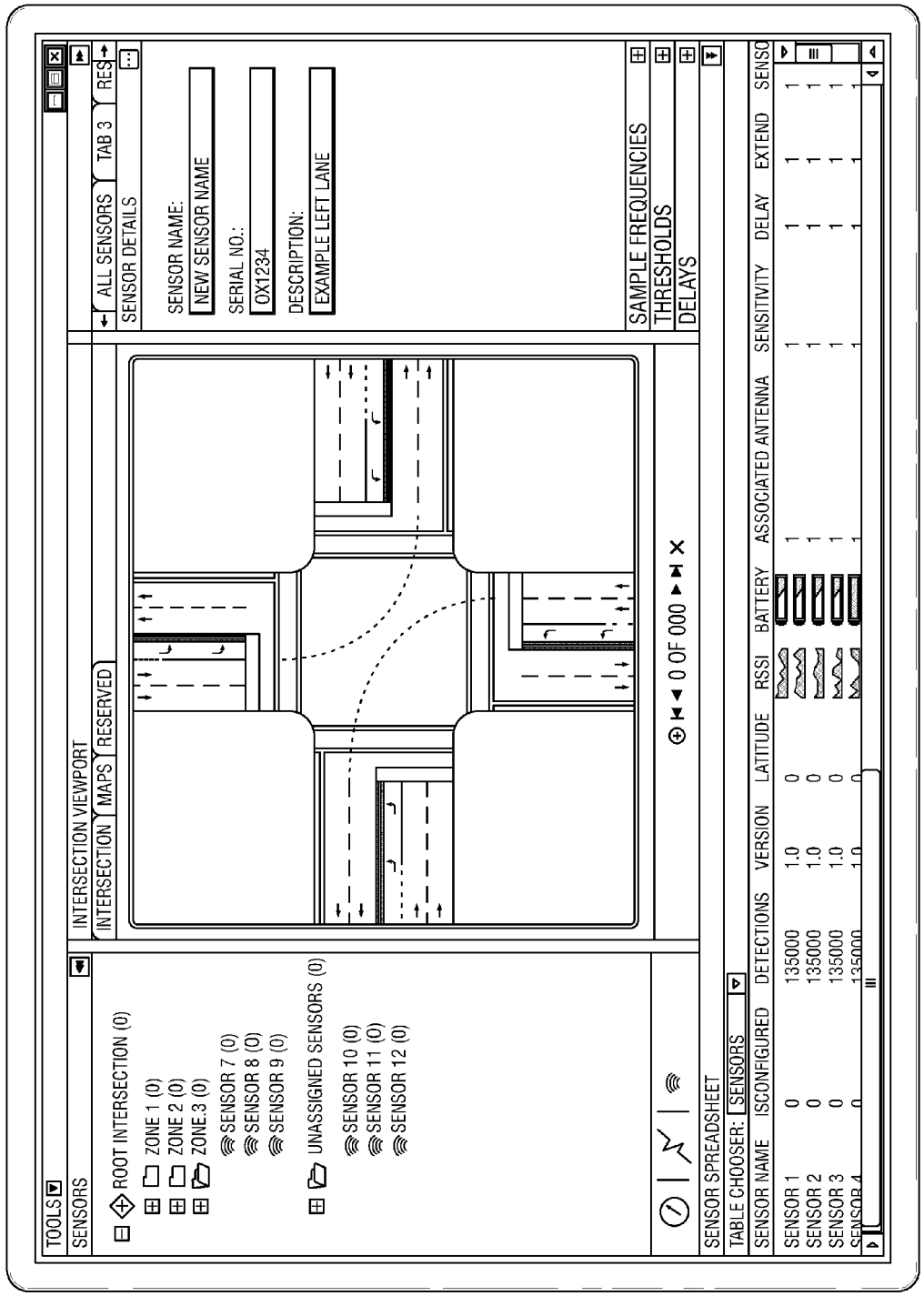
FIG. 20 illustrates a graphical user interface to manage the wireless vehicle detection system according to an embodiment of the invention.

Each traffic region can utilize one or more sensor pods that make up a zone. Each zone uses an access point 300 that is in communication with one or more sensor pods 200 according to an embodiment of the invention. The zones and sensors can be mapped using a graphical user interface (GUI), such as illustrated in FIG. 20 for example. The base station 400 automatically detects the presences of sensors 200 and the GUI can be viewed on a remote device 407 to facilitate the mapping of the sensors according to an embodiment of the invention. The interface can be viewed using a web browser and can illustrate, for example, a sensor tree that illustrates the organization of sensors, and details of individual sensors. As understood by those skilled in the art, such sensor details can include, for example, a sensor name, unique id, sensor description, the current mode, read right frequency, battery level, vehicle sample frequency, sensitivity, and detect timeout.

In an embodiment of the invention, sensor information and processed sensor data can be viewed using the GUI using data processed by the base station 400. The base station 400 has the computing power of an advance transportation controller (ATC), as understood by those skilled in the art, and is adapted to provide data processing and storage of data for a plurality of sensor pods in a plurality of zones according to an embodiment of the invention. The base station can be connected to a LAN or a WAN. In some embodiments, one or more web services are used on private networks to provide access to information relating to the wireless vehicle detector system 100.

Figure 15:
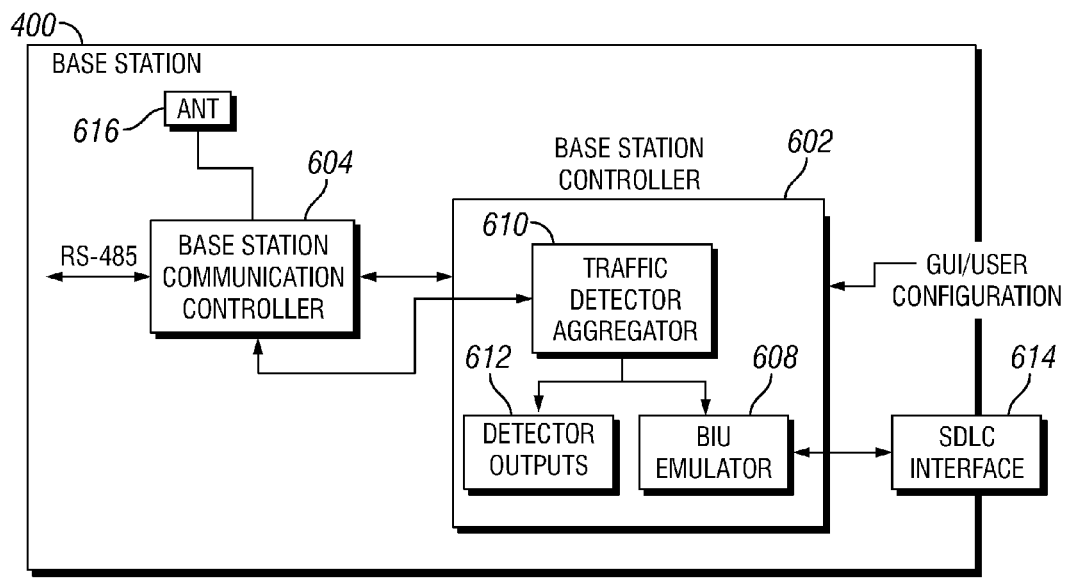
FIG. 15 illustrates a block diagram of the base station according to an embodiment of the invention.

As illustrated in FIG. 15, an embodiment of the base station 400 can include a base station controller 602, a base station communication controller 604, an antenna 616 adapted to communicate in the 2.4-2.5 Ghz ISB band, and a synchronous data link control (SDLC) interface 614 as understood by those skilled in the art. The SDLC interface 614 can be used to connect to a traffic controller 402. Embodiments of the invention include, for example, Bus Interface Units (BIU) to emulate detector to the traffic controller 402. The base station communication controller 604 can be adapted to facilitate communication with a plurality of access points 300. The base station controller 602 can include, for example, a traffic detector aggregator 610, detector outputs 612, and one or more BIU emulators 608. According to an embodiment, the base station is positioned near the top of the traffic controller cabinet 600 and an AC power cord is used to provide power between the base station 400 and an interface panel in the cabinet 600 as understood by those skilled in the art.

The base station can also include one or more non-transitory memories encoded with one or more computer programs operable by the base station controller 602 according to an embodiment of the invention. The base station can perform signal processing functions for the plurality of sensors 200 in the wireless vehicle detection system 100. For example, according to an embodiment of the invention, the base station 400 can execute one or more computer programs to analyze and interpret sensed data for counting the number of vehicles, occupancy, perform speed calculation, and other roadway conditions.

Figure 16:
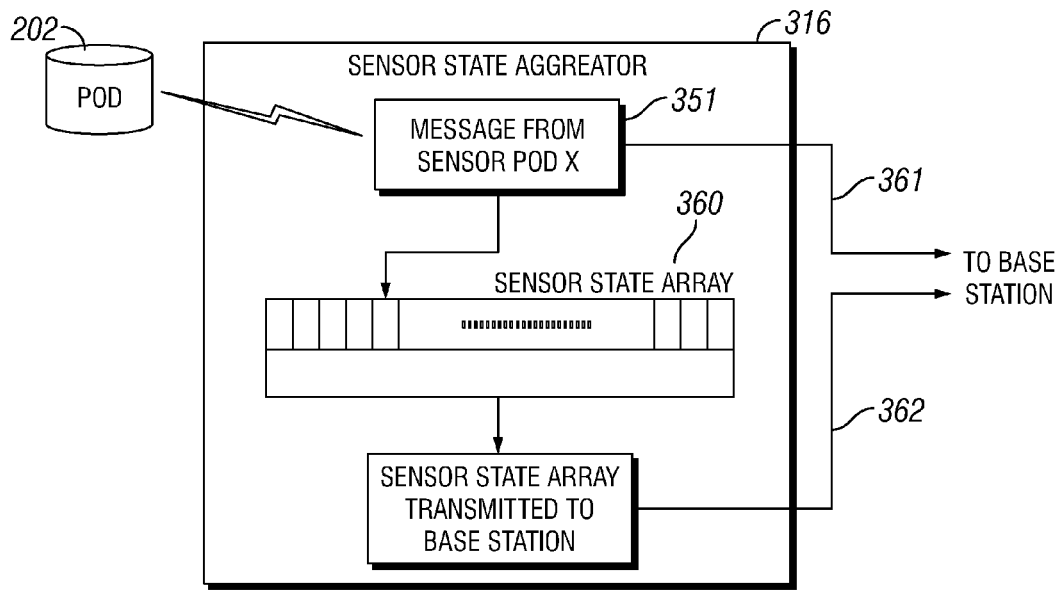
FIG. 16 illustrates a block diagram of the sensor state aggregator according to an embodiment of the invention.

FIGS. 16 and 7 illustrate an embodiment of the sensor state aggregator 316 on or associated with an access point module controller 310. The sensor state aggregator 316 maintains a sensor state array 360 in which each attached sensor pod 200 has an entry. These entries for sensor pods contain the current detect status for each sensor in a zone. According to an embodiment of the invention, every message 351 sent by a sensor pod to the access point 300 contains the current detect status. Using this status, the sensor state array 360 is updated with every message received and sent to the base station periodically or upon demand. All of the individual status messages 361 are transferred to the base station and may be responsive to an event trigger. The individual status messages 361 typically include a time stamp associated with the status change.

Embodiments of the invention can include, for example, a sensor state aggregator 316 comprising a set of instructions that cause the access point 300 to perform the operations when the instructions are executed by the access point module controller 310, for example. The operations of the sensor state aggregator 316 associated with the access point can include, for example, generating a first sensor state array 360, each of the one or more sensor pods 200 in the respective zone having an entry in the sensor state array. The operations of the sensor state aggregator 316 can further include, for example, updating the sensor state array 360 responsive to receiving one or more signals from the one or more sensor pods 200 in the respective zone, the one or more signals including current detect status of the one or more sensor pods, and communicating an output message indicating a time stamp and event trigger details responsive to receiving an individual status message 361 from one or more of the sensor pods responsive to an event trigger. The operations of the sensor state aggregator 316 can further include, for example, communicating the updated sensor state array indicating current detect status of the one or more sensor pods to the base station upon demand or periodically.

Figure 17:
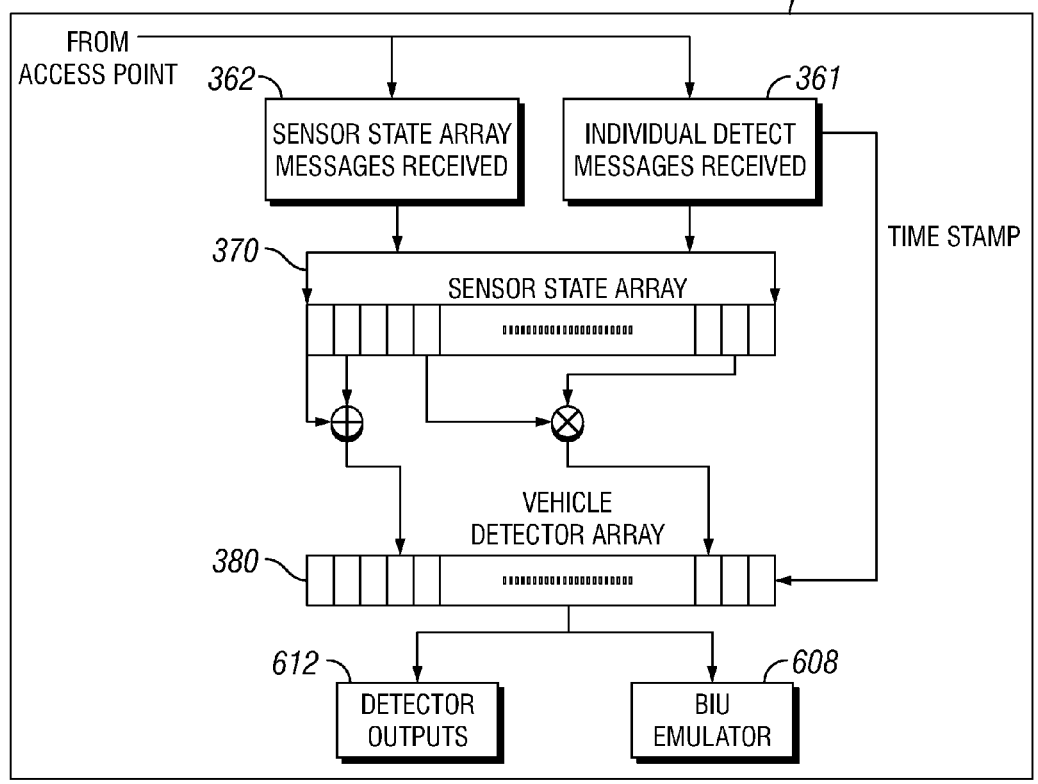
FIG. 17 illustrates a block diagram of the traffic detector aggregator according to an embodiment of the invention.
Figure 18:
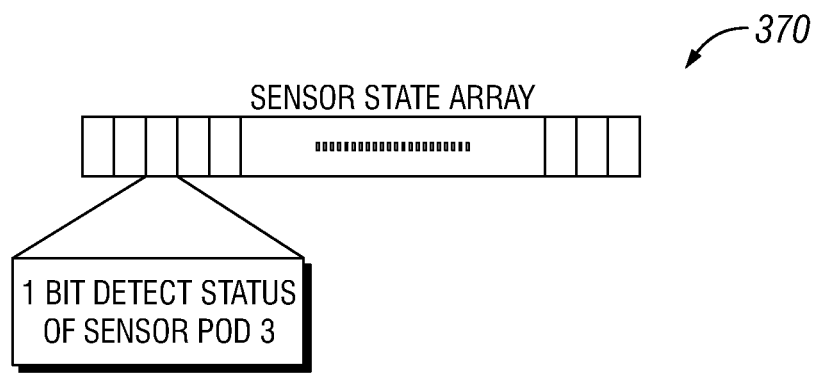
FIG. 18 illustrates the sensor state array according to an embodiment of the invention.
Figure 19:
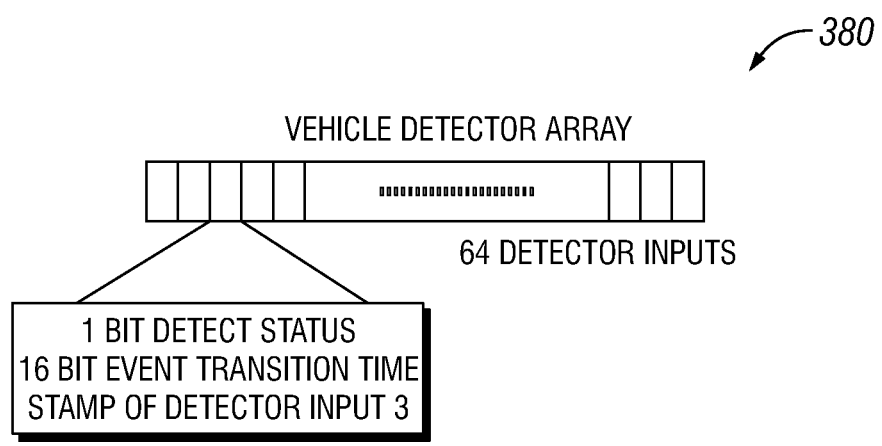
FIG. 19 illustrates the vehicle detector array according to an embodiment of the invention.

FIG. 17 illustrates an overview of a traffic detector aggregator 610 on or associated with the base station 400 according to embodiments of the present invention. The base station 400 receives the sensor state array message 362, and individual sensor messages 361 from the access point. Based on the type of message, it is parsed and routed differently as understood by those skilled in the art. According to an embodiment of the invention, every message from sensor pod contains its detect status bit, but only the dedicated detect status messages 360 contains the time stamp for the event as will be understood by those skilled in the art. The base station also maintains a sensor state array 370 (see e.g., FIG. 18) that is similar to the sensor state array 360 associated with the access point 300. The sensor state array 370 associated with the base station, in some embodiments, includes information indicating the current detect status for all of the sensors 200 in the plurality of zones. The traffic detector aggregator 610 can also maintain a vehicle detector array 380, which maintains the status of numerous, e.g., 64, physical detector inputs, along with a 16 bit time stamp of when the status changed last time. FIG. 19 illustrates an embodiment of the vehicle detector array 380. According to an embodiment of the vehicle detector array 380, the vehicle detector array maintains the detector inputs and the time stamp information for a plurality of sensors in a plurality of zones.

Embodiments of the invention can include, for example, a traffic detector aggregator 610 comprising a set of instructions that cause the base station 400 to perform the operations when the instructions are executed by the base station controller 602, for example. The instructions of the traffic detector aggregator 610 associated with the base station is adapted to aggregate data from the plurality of access points in the plurality of zones so that a user can configure and monitor the wireless vehicle detection system 100 according to an embodiment of the invention. The traffic detector aggregator 610 can include, for example, a set of instructions that cause the base station 400 to perform operations such as, generating a sensor state array 370 associated with the base station 400, each of the one or more sensor pods in all of the zones having an entry in the sensor state array 370. Embodiments of the invention can further include operations such as updating the sensor state array 370 responsive to receiving updated sensor state array 360 from one of the plurality of access points 300. Embodiments of the invention can also include, for example, generating a vehicle detector array 380 comprising information indicating a physical detector input for each of the zones of and time stamps of event triggers, and updating the vehicle detector array 380 responsive to receiving the output message from one of the plurality of access points 300.

The sensor state arrays, traffic detector aggregator, and vehicle detector array maintained by the base station 400 and the access point 300 can be implemented and maintained by electronic hardware, software, or a combination of the two as understood by those skilled in the art.

According to an embodiment, each zone is assigned a physical detector bit in the vehicle detector array 380 and each BIU 608 is mapped to 16 physical detector inputs. In an example embodiment, physical detector bits 1-16 are controlled by BIU1, 17-32 are controlled by BIU2, and so on. According to an embodiment, a base station can emulate BIU's 1 to 4, in other embodiments it can emulate BIU's 1 to 8 as understood by those skilled in the art. According to an embodiment, the vehicle detector array 380 is updated with every message received from every sensor pod in all of the zones and the physical detector status is changed based on the user configured zone mapping. When the base station emulates a BIU 608, it is adapted to respond to a request from the traffic controller on the SDLC interface 614 as understood by those skilled in the art. The traffic controller can act as a master and requests data from the BIU periodically.

An embodiment of a method to aggregate sensor data associated with an access point in a wireless vehicle detection system, for example, can include maintaining accurate detect status, volume and occupancy data if communication to base station is interrupted so that accuracy of data is not reduced by momentary disruptions or delays in communication to base station 400 and packing communication data for greater transfer efficiency. Together, these characteristics, among others, allow for the use of a low-cost RF link, such as Zigbee. Use of a wireless communication link between the access point 300 and the base station 400 is more convenient and less costly to install than a wired link in many cases. Aggregation and combination of the sensor data into detect states for input to the controller 602 at the base station 400, for example, allows for combination of individual sensor states and data to be combined in different ways to generate intelligent vehicle detection inputs and allows data to be formatted in different ways to support multiple interface methods to the controller. As understood by those skilled in the art, emulation of one or multiple BIUs 608, for example, allows for a simple and flexible way to transfer detection states to the controller and allows use of a pre-existing, standard interface (such as NEMA TS2) which, in turn, allows for ease of installation and configuration (e.g., only one serial cable connection is needed). As appreciated by those skilled in the art, embodiments of the present invention allow for configurable single or multiple BIUs accommodating different equipment configurations in the cabinet assembly without additional hardware assemblies, adapters, or multiple cables.

In the various embodiments of the invention described herein, a person having ordinary skill in the art will recognize that various types of memory are readable by a computer such as the memory described herein in reference to the various computers and servers, e.g., computer, computer server, web server, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

The present application is a continuation application which claims priority to and the benefit of U.S. Non-Provisional patent application Ser. No. 14/475,916, titled, "Wireless Vehicle Detection System and Associated Methods Having Enhanced Response Time," filed on Sep. 3, 2014, which is a continuation of U.S. Non-Provisional patent application Ser. No. 14/194,162, titled, "Wireless Vehicle Detection System and Associated Methods Having Enhanced Response Time," filed on Feb. 28, 2014, now U.S. Pat. No. 8,855,902, issued Oct. 7, 2014, which claims priority and benefit to provisional application No. 61/770,606, titled, "Wireless Vehicle Detection System and Associated Methods Having Enhanced Response Time," filed on Feb. 28, 2013; application No.

61/770,789, titled, "Wireless Vehicle Detector Aggregator and Interface to Controller and Associated Methods," filed on Feb. 28, 2013; and application No. 61/770,951, titled "Wireless Vehicle Detection System, Sensor Pods, and Associated Methods," filed on Feb. 28, 2013, each of which is incorporated herein by reference in its entirety. This application is also related to U.S. patent application Ser. No. 14/194,280, titled "Wireless Vehicle Detector Aggregator and Interface to Controller and Associated Methods," filed on Feb. 28, 2014, which is also incorporated herein by reference in its entirety.

In the drawings and specification, there have been disclosed embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification, and such modifications and changes are to be considered equivalents and part of this disclosure.

That is claimed:

1. A wireless vehicle detection system comprising:
one or more spaced-apart sensor pods positioned in close proximity to a plane of a surface of a road and to detect received communication signal strength, and operated to adjust transmitting power based upon the communication signal strength to thereby conserve power usage, each sensor pod including: (1) one or more vehicle detector controllers adapted to determine presence of one or more vehicles, (2) one or more communication controllers in communication with the vehicle detector controllers and adapted to communicate data relating to the presence of one or more vehicles, the one or more vehicle detector controllers and the one or more communication controllers each collectively having separate clock cycles and separately controlled sleep cycles for drawing power, (3) one or more batteries, (4) one or more circuits electrically connected to the one or more batteries to enhance protection of the one or more batteries from degradation at transmit power levels and enhance the life extension of the one or more batteries; and (5) one or more low profile antennas positioned within an enclosure of the sensor pod and adjacent an end portion of the enclosure, the one or more antennas being positioned to support one or more communication frequencies within a preselected radio frequency band; and
a base station in communication with the one or more sensor pods to provide data processing and storage for the wireless vehicle detection system.

2. The system of claim 1, wherein the one or more vehicle detector controllers is adapted to communicate with the communication controller, the one or more vehicle detector controllers further comprising:
a plurality of magnetic sensors to sense the presence of one or more vehicles, and to output sensed data corresponding to the presence of one or more vehicles;
a calibration module to adjust for sensor offset, or to set or reset the plurality of magnetic sensors; and
a sensor controller to determine the presence of the one or more vehicles responsive to one or more of the plurality of magnetic sensors outputting the sensed data.

3. The system of claim 2, wherein the one or more communication controllers communicate with the one or more vehicle detector controllers via a serial link, the one or more communication controllers further comprising:
a radio transceiver to communicate in the 902-928 Mhz ISM band; and
a communication controller to generate a packet suitable to be wirelessly transmitted via the antenna to an access point.

4. The system of claim 3, wherein the one or more vehicle detector controllers communicate with the one or more communication controllers, the one or more vehicle detector controllers further comprising:
a plurality of magnetic sensors to sense the presence of one or more vehicles, and to output sensed data corresponding to the presence of one or more vehicles;
a calibration module to adjust for sensor offset, or to set or reset the plurality of magnetic sensors; and
a sensor controller to determine the presence of the one or more vehicles responsive to one or more of the plurality of magnetic sensors outputting the sensed data;
wherein the one or more communication controllers further comprises:
a radio transceiver to communicate in the 902-928 Mhz ISM band; and
a communication controller to generate a packet suitable to be wirelessly transmitted via the antenna to the access point.

5. The system of claim 1, further comprising an access point in communication with the one or more sensor pods and the base station, and wherein the access point further comprises a plurality of antennas, one or more first antennas of the plurality of antennas to communicate with the base station at a communication frequency of approximately 2.4 GHz and one or more second antennas of the plurality of antennas to communicate with the one or more sensor pods at a communication frequency in the range of approximately 902-928 Mhz.

6. The system of claim 5, wherein the access point comprises an access point housing and an omnidirectional antenna positioned remote from the access point housing, the omnidirectional antenna to communicate wirelessly with the one or more sensor pods and to communicate with an antenna associated with the access point housing.

7. The system of claim 1, wherein the one or more vehicle detector controllers comprises a plurality of magnetic sensors to sense the presence of one or more vehicles, and to output sensed data corresponding to the presence of one or more vehicles.

8. The system of claim 7, wherein the plurality of magnetic sensors include at least one of an x-axis sensor, a y-axis sensor, and a z-axis sensor; and the system further comprising an access point adapted to communicate with the base station wirelessly at a communication frequency of approximately 2.4 GHz or via one or more wires, and further to communicate with the one or more sensor pods at one or more communication frequencies in the range of 902-928 Mhz.

9. A wireless sensor pod to be positioned in close proximity to a plane of a surface of a road, the sensor pod comprising:
(1) a vehicle detector controller to determine presence of one or more vehicles;
(2) a communication controller to detect received communication signal strength and to adjust transmitting power based upon the communication signal strength to thereby conserve power;
(3) a battery;
(4) a capacitor circuit connected in parallel electrically to the battery to enhance protection of the battery from degradation at transmit power levels and extend the life of the battery; and (5) an antenna positioned in within the sensor pod to support a preselected radio frequency band.

10. The sensor pod of claim 9, the communication controller further comprising a radio transceiver to communicate in the 902-928 Mhz ISM band;

the antenna;

the preselected radio frequency band including a 902-928 MHz ISM radio frequency band; and the communication controller further being positioned to generate a packet suitable to be wirelessly transmitted via the antenna to an access point.

11. The sensor pod of claim 10, wherein the vehicle detector controller further comprises:

a plurality of magnetic sensors to sense the presence of one or more vehicles, and to output sensed data corresponding to the presence of one or more vehicles;

a calibration module to adjust for sensor offset, or to set or reset the plurality of magnetic sensors; and a sensor controller to determine the presence of the one or more vehicles responsive to one or more of the plurality of magnetic sensors outputting the sensed data;

wherein the communication controller further comprises a radio transceiver to communicate in the 902-928 Mhz ISM band, and wherein the communication controller further being positioned to generate a packet suitable to be wirelessly transmitted via the antenna to the access point.

12. A sensor pod of claim 9, further comprising a non-transitory computer readable storage medium having an executable program stored thereon, and one of the vehicle detection controller or the communication controller to execute the executable program to wake up the sensor pod from sleep mode to execute a function and to queue a next function to be subsequently executed.

13. A method for detecting one or more vehicles, the method comprising:

installing a sensor pod in close proximity to a plane of a surface of a road to detect and receive communication signal strength and adjust transmitting power responsive to said communication signal strength to thereby conserve power, the sensor pod including (1) a vehicle detection controller to determine presence of one or more vehicles, (2) a communication controller to communicate data relating to the presence of one or more vehicles, the one or more vehicle detector controllers and the one or more communication controllers each collectively having separate clock cycles and separately controlled sleep cycles for drawing power, (3) a battery, (4) a circuit connected electrically to the battery to enhance protection of the battery from degradation at transmit power levels, and (5) an antenna positioned at least partially in the sensor pod to support one or more communication radio frequencies;

transmitting data relating to the presence of one or more vehicles from the sensor pod to an access point positioned remote the sensor pod; and providing data processing to a traffic controller by a base station positioned remote from the access point and the sensor pod, the data processing being responsive to the base station receiving data from the access point.

14. A method of claim 13, wherein the access control comprises:

one or more first antennas to communicate with the sensor pod at a communication frequency in a range of approximately 902-928 MHz; and one or more second antennas to communicate with the base station of the wireless vehicle detection system at a frequency of approximately 2.4 GHz.

15. A method of claim 14, wherein the vehicle detector controller comprises a plurality of magnetic sensors adapted to sense the presence of one or more vehicles, and to output sensed data corresponding to the presence of one or more vehicles.

16. A method of claim 14, wherein the vehicle detector controller further comprises:

a plurality of magnetic sensors to sense the presence of one or more vehicles, and to output sensed data corresponding to the presence of one or more vehicles;

a calibration module to adjust for sensor offset, or to set or reset the plurality of magnetic sensors; and a sensor controller to determining the presence of the one or more vehicles responsive to one or more of the plurality of magnetic sensors outputting the sensed data.

17. A method of claim 13, wherein the communication controller further comprises:

a radio transceiver adapted to communicate in the 902-928 Mhz ISM band; and wherein the communication controller further being positioned to generate a packet suitable to be wirelessly transmitted via the antenna to the access point.

* * * * *